United States Patent [19]

Moorman et al.

[11] 4,019,279
[45] Apr. 26, 1977

[54] ROOT CONTROL PLANTER

[76] Inventors: Maurice D. Moorman, 8124 Holy Cross Place, Los Angeles, Calif. 90045; Leonard N. Albrecht, 8780 Shoreham Drive, Los Angeles, Calif. 90069

[22] Filed: June 9, 1975

[21] Appl. No.: 585,048

[52] U.S. Cl. .................................. 47/25; 47/33; 47/66; 47/84; 47/73; 47/58
[51] Int. Cl.² ................... A01G 17/00; A01G 9/02; A01G 11/00
[58] Field of Search ............. 47/25, 33, 32, 34, 37, 47/34.11, 58

[56] References Cited
UNITED STATES PATENTS

| 78,233 | 5/1868 | Poullain | 47/37 |
| 100,300 | 3/1870 | Ludlum | 47/37 |
| 173,446 | 2/1876 | Cottman | 47/25 |
| 1,500,917 | 7/1924 | Bell | 47/37 X |
| 1,636,625 | 6/1927 | Conrad | 47/37 |
| 2,017,308 | 10/1935 | Elmer | 47/37 |
| 2,769,277 | 11/1956 | Keelor | 47/33 |
| 3,053,010 | 9/1962 | De Shazor, Jr. | 47/34 |
| 3,889,416 | 6/1975 | Bergeron | 47/34.13 |

Primary Examiner—Edgar S. Burr
Assistant Examiner—James R. Feyrer
Attorney, Agent, or Firm—Lindenberg, Freilich

[57] ABSTRACT

A tree planter which prevents the roots of a tree from cracking a nearby sidewalk, including a planting container which is buried in the ground with a young tree therein, the container having sidewalls of slick and impenetrable material such as plastic, and with the sidewalls sloping outwardly, so that the open bottom of the container is larger than the top, to help deflect roots downwardly so that when they begin growing outwardly they grow at a level far below the sidewalk.

13 Claims, 10 Drawing Figures

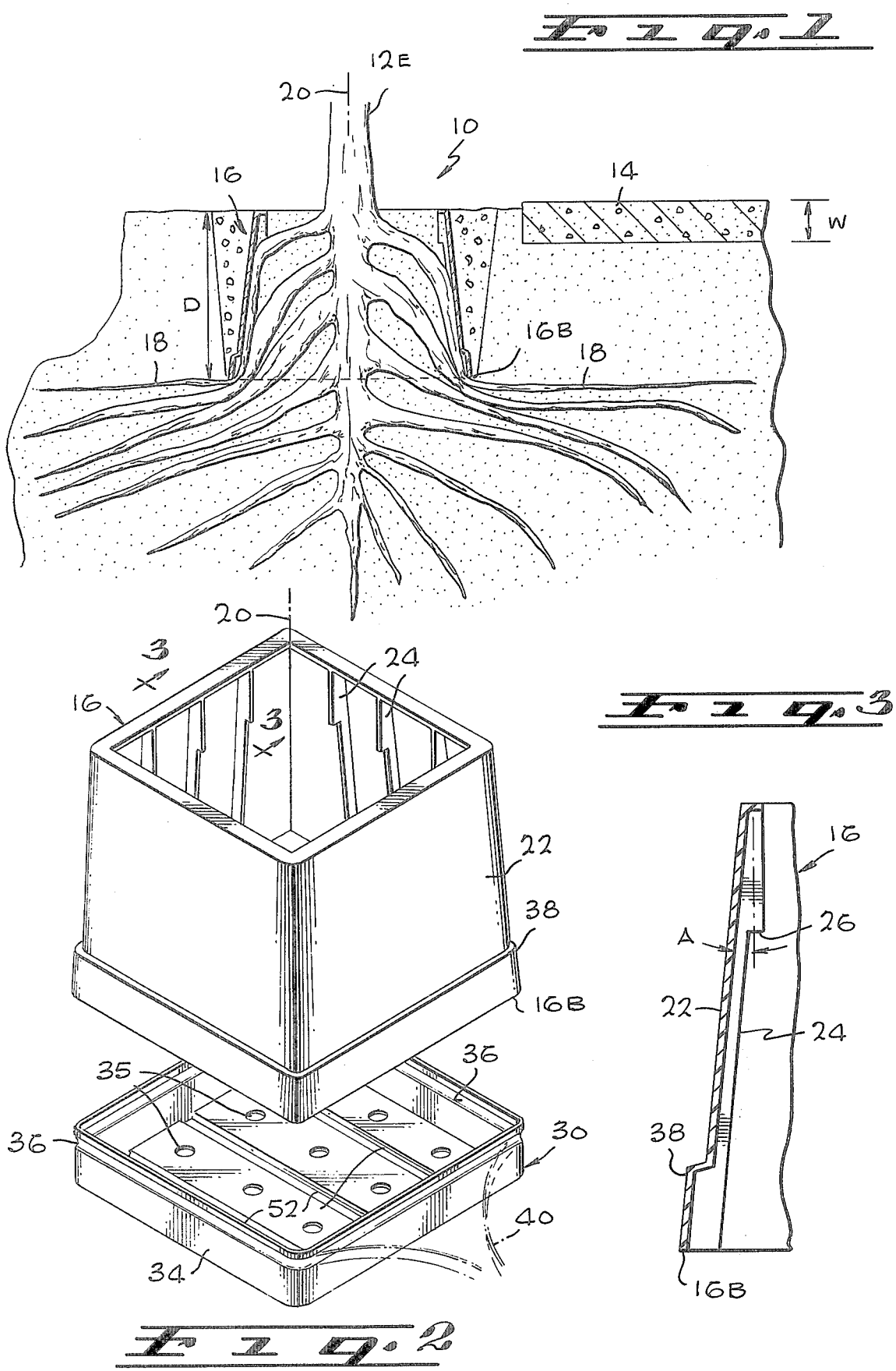

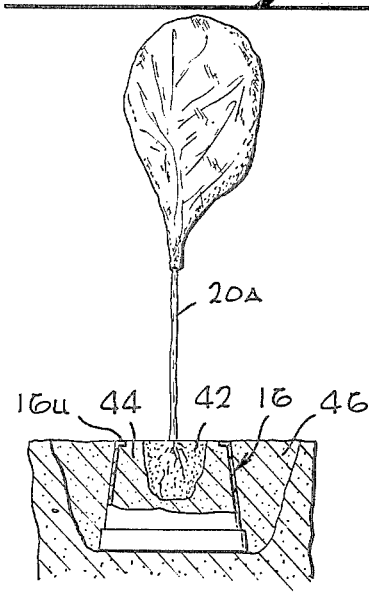
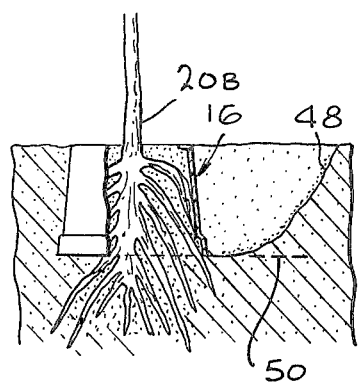
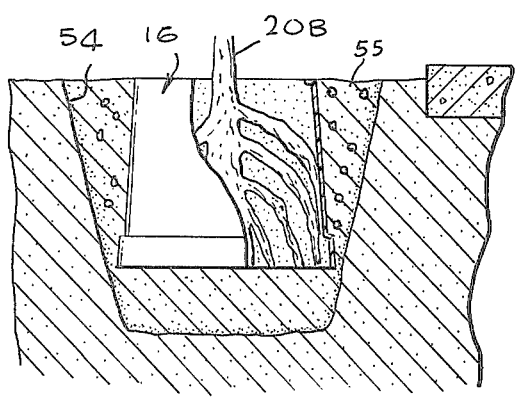
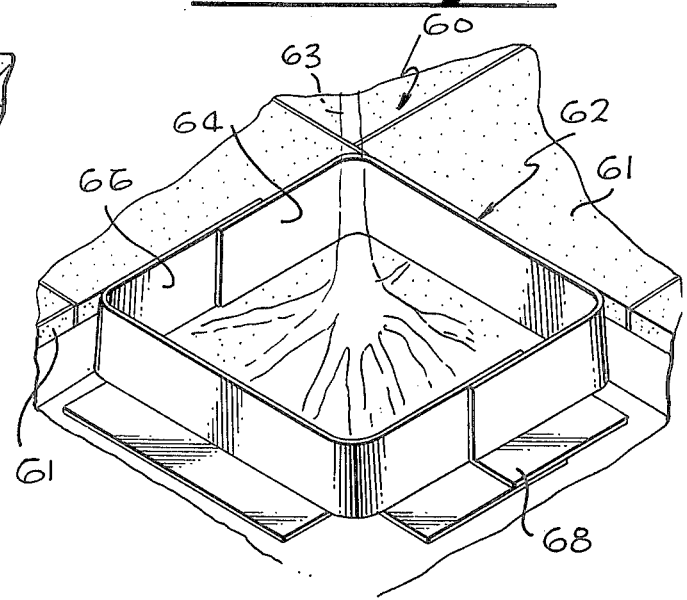
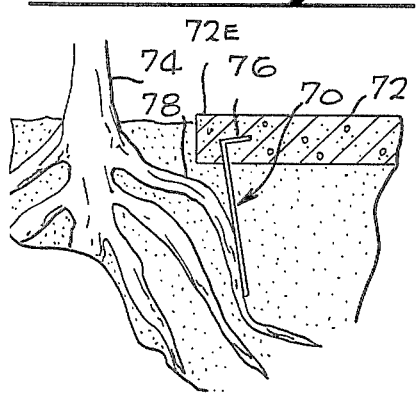
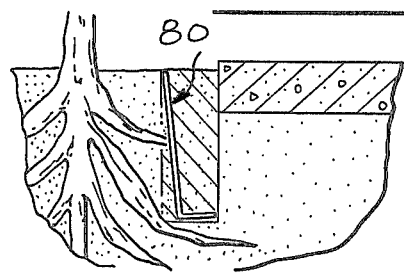

4,019,279

ROOT CONTROL PLANTER

BACKGROUND OF THE INVENTION

This invention relates to apparatus for controlling the growth of the roots of trees planted near a sidewalk, curb, or the like.

The cracking of sidewalks, curbs, driveways, building foundations, and the like by nearby trees is a well-known phenomenon. Steps which can be taken to avoid such damage, such as the destruction of roots leading under the sidewalk, is difficult and expensive. An apparatus and method for growing trees so that their roots will not damage nearby sidewalks and the like, would be of great benefit.

SUMMARY OF THE INVENTION

In accordance with one embodiment of the present invention, a simple and low cost planting apparatus and method is provided which enables the growing of a tree near a sidewalk or the like without damage to the sidewalk by the roots of the tree. The apparatus includes a container in which the young tree is planted, the container and tree being planted in the ground near a sidewalk and with the top of the container being substantially even with the surrounding soil. The container has sidewalls of slick and root-impenetrable material such as slick plastic, and with the walls sloping outwardly down to the open bottom of the container. As a result, when the young roots reach the container walls, the roots are deflected downwardly, and begin to grow outwardly only after they reach the bottom of the slick walls. The roots tend to continue growing downwardly and outwardly at the same depth as the bottom of the container, which is considerably below the level of the sidewalk. As a result, any roots which grow under the sidewalk and which greatly increase in diameter as the tree ages, will not contact the sidewalk to lift and crack the sidewalk.

The novel features of the inventions are set forth with particularity in the appended claims. The invention will best be understood from the following description when read in conjunction with the accompanying drawings.

BRIEF DESCRIPTION OF THE DRAWINGS

FIG. 1 is a sectional side view of a tree installation of the present invention, shown at a time long after the installation;

FIG. 2 is a perspective and exploded view of a tree planter of the type illustrated in FIG. 1, and also showing a removable bottom therefore;

FIG. 3 is a view taken on the line 3—3 of FIG. 2;

FIGS. 4 – 7 are side views showing the tree growing in an installation method of the present invention during stages prior to the development of the installation as shown in FIG. 1;

FIG. 8 is a partial perspective view of a planting installation constructed in accordance with another embodiment of the invention;

FIG. 9 is a sectional side view of a planting installation constructed in accordance with still another embodiment of the invention; and FIG. 10 is a sectional side view of a planting installation constructed in accordance with yet another embodiment of the invention.

DESCRIPTION OF THE PREFERRED EMBODIMENTS

FIG. 1 illustrates a tree installation 10 showing a fairly mature tree 12E with its center close to a sidewalk 14. The roots near the trunk of the tree are located within a container or tree planter 16 which controls the growth of the roots 18, so that the root portions which extend laterally by more than a few feet from the center or axis 20 of the planting location and tree trunk, grow at a considerable depth D below the ground. The depth D is much greater than the depth W of the sidewalk 14 below the ground. As a result, as the tree further matures and the roots 18 become thicker, they will still not come close to the sidewalk 14 or in contact therewith, so that the sidewalk will not be pushed upwardly and cracked.

The cracking of sidewalks by tree roots is normally caused by roots which lie immediately below the sidewalk within a few inches thereof, and which expand in diameter as the tree matures. As the root diameter reaches a point where the root contacts the sidewalk or presses against dirt which is not pushed aside, the sidewalk is pressed upwardly and it is deformed or cracks. In the present invention, a container is provided which will direct the tips of the young roots as they grow outwardly from the center 20 of the tree planting location. Although the tips of some roots tend to extend horizontally, they can be deflected from their normal course. In the present invention, apparatus is provided which deflects the roots downwardly to a depth considerably below the sidewalk. Thereafter, the roots tend to grow downwardly and horizontally at this depth, so that they will not come close to the sidewalk as they increase in diameter with maturity.

FIGS. 2 and 3 illustrate details of the planting container 16 in which a tree can be grown, and which forms a deflector that causes the roots to grow outwardly at a considerable depth below the ground. The container includes side walls 22 which extend in a largely vertical direction but at a downward outward angle with respect to the vertical, so that the bottom of the container is larger than the top. In addition, the sidewalls 22 are constructed of a material, such as polyethylene plastic or other slick and nonporous material, which is slick and which cannot be penetrated by the tips of the roots as they grow outwardly from the tree. As a result, as the tips of the roots reach the sidewalls 22, the tips are deflected to grow down along the sidewalls. The outward angling of the sidewalls 22 encourages the deflected roots to be deflected downwardly, so that they tend to grow downwardly along the sidewalls until they reach the bottom 16B of the container. Thereafter, the roots are free to grow outwardly, but at a deep level within the ground.

The container 16 is provided with a plurality of ridges 24 which extend largely vertically along the inside wall surfaces of the sidewalls 22. The ridges 24 help to prevent the deflected roots from growing sidewardly, which could cause their entanglement with one another (commonly described as root binding). The ridges 24 are constructed with a stepped portion 26 near their upper ends to facilitate the stacking of containers on one another for storage and shipping without binding together. Thus, the ridges 24 serve dual purposes, in avoiding root entanglement and in facilitating storage of the planting containers. A complete container assembly includes a bottom cover 30 which is utilized to cover the bottom of the container during shipping or during initial growing and storage above ground of a young tree that is to be transplanted. The cover 30 has a bottom sheet portion 32 with drainage holes 35, and has short upstanding sidewalls 34 which have an indentation 36. When the cover is placed over an outstepped lower sidewall portion 38 of the container, the indentation 36 of the bottom cover lies slightly over the outstepped container portion 38. A band indicated at 40 then can be tightened about the indentation 36 to hold the cover 30 to the container 16.

FIGS. 4 – 7 illustrates a preferred commercial growth and installation method of the present invention, where a tree of substantial size is to be transplanted at the final location. Initially, the tree is grown from a seed or other part of a mature tree in a normal fashion, as in the ground or in a small pot. As shown in FIG. 4, the small tree or starter tree 20A together with soil 42 around its roots, is then installed in soil 44 of a container or planter 16 of the present invention which has been already installed in a shallow hole in the ground, with the upper end 16U of the container preferably a few inches above the level of the surrounding ground. The area 46 immediately about the container 16 is preferably filled with gravel-type filler material, to carry water down to the bottom of the container so the roots do not tend to grow up, while planting mix preferably will have been placed below the bottom level of the container 16. Normal watering of the starter tree inside the planting container is performed in the same manner as it would be performed if the planting container were not used.

FIG. 5 illustrates the starter tree 20B which is partially matured in a field grown installation, and with the roots having grown downwardly to the bottom of the walls of the container 16 (the tap root and some of the other roots extend below the bottom of the container). The container with the tree 20B therein is then ready to be transplanted to the final planting location. This is accomplished by removing soil to leave a hole 48, and by cutting off the roots of the tree at a cut line 50 along the bottom of the container. After the container with the tree 20B has been removed from the ground as by a loader machine, the bottom of the container is covered by the bottom cover 30 as shown in FIG. 6. It may be noted that the bottom cover 30 has skid grooves 52 which aid in the lifting of the unit for transportation and moving on a truck bed. At the site of the final installation, as shown in FIG. 7, a hole 54 is dug, the bottom cover 30 of the container assembly is removed and discarded, the container 16 is installed in the ground with its upper end even with the surrounding soil level or within an inch or two thereof, and the hole is backfilled as in the original planting, preferably with gravel 55 at least at the side nearest the sidewalk. The roots of the tree can now continue to grow, and will tend to grow at a level substantially no higher than the bottom of the container, to form a mature tree as shown in FIG. 1. Where it is not necessary to initially plant a large tree at the final location, a young tree may be planted in the container 16 which is installed in the position of FIGS. 1 and 7. Where a Christmas tree is transported to a customer site each year and removed several weeks later, the tree may be kept in its container at all times, with the roots being recut along the bottom of the container as shown at cut line 50 in FIG. 5 before each return to the customer.

Thus, the container encourages the roots to grow downward and outward at a considerable depth below the ground to avoid root damage to sidewalks and the like. The ridges 24 of the container minimize root entanglement and binding. The deep roots not only avoid damage to nearby structures, but also result in a stronger plant and permit the planting of annuals and grass up to the trunk or base of the tree. For a typical sidewalk which extends only a few inches below ground level, a planting container with sidewalls 22 of a foot in depth is normally sufficient to guard against damage to nearby sidewalks, although a sidewall depth of about one and one-half feet is preferred.

FIG. 8 illustrates a container installation 60 primarily useful for the control of roots on an existing large tree 63 which is growing in a small plot completely surrounded by sidewalks 61. In this installation, the container 62 is formed by a pair of extrusions in the form of sheets 64 and 66 completely surrounding the tree 63. In order to install the container, the roots of the tree are first cut off and soil is removed to leave a trench at the periphery of the plot where the container is to be installed, to permit installation of the sheets so they will be level with the existing soil. The flanges 68 are provided to secure the sheets in the soil. This planter prevents the existing surface roots from growing out and directs new roots down and out.

FIG. 9 illustrates a deflector 70 installed in a sidewalk 72 near which a tree 74 is growing. The deflector 70 is a simple sheet of slick material such as polyethylene or polyvinylchloride plastic, with a flanged upper end 76 which is installed in the edge portion 72E of the sidewalk nearest the base of the tree so that the deflector lies between the center of the tree and most of the sidewalk. It can be seen that as the roots 78 of the tree reach the deflector 70, the deflector urges the roots to grow downwardly so that they will lie considerably below the sidewalk 72. Where a sidewalk already exists, a trough can be dug along the edge of the sidewalk to install a deflector sheet therein, as shown at 80 in FIG. 10.

Thus, the invention provides a deflector arrangement, which may be in the form of a container completely surrounding the base of a tree or merely positioned along one side of the tree, which encourages downward growth of the tree roots, so that they will grow outwardly at a great enough depth to avoid damage to surrounding sidewalks as the roots grow in diameter with maturity of the tree. The invention can be utilized for shrubs, and therefore the term "tree" includes any plant whose roots can crack a sidewalk or the like.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a tree installation which includes a planting location near a sidewalk or other structure which can be cracked by a root of a tree, and which also includes a tree centered on said location and which is of a kind whose roots can reach and crack the structure, the improvement comprising:
a root deflector disposed between said planting location and most of said structure, said deflector being made of a material which does not disintegrate with time and having root impenetrable smooth walls with a top at least within a few inches of ground level and with a bottom at least one foot below the top of the ground, said deflector being open at the bottom, whereby roots upon contacting said deflector are generally directed downwardly and can emerge only from the bottom of the deflector at a depth that prevents them from cracking the sidewalk or other nearby structure.

2. The improvement described in claim 1 wherein: said deflector walls extend 360° about said tree.

3. The improvement described in claim 1 wherein: said deflector walls extend at a downward, outward inclination.

4. The improvement described in claim 1 including: a plurality of vertically-extending ridges formed on a side of said deflector wall which faces said tree and extending along most of the height of said wall, with said ridges laterally spaced from one another, whereby to minimize entanglement of deflected roots.

5. The improvement described in claim 1 wherein: said deflector comprises a sheet with an upper end imbedded in said sidewalk along an edge portion thereof which is nearest said planting location.

6. The improvement described in claim 1 wherein: said planting location includes a plot of soil of limited length and width; and
said deflector comprises at least one sheet-like member extending around the perimeter of said plot, with the lower edge portion of the member extending outwardly away from the central vertical axis of the tree.

7. In a tree installation which includes a planting location near a sidewalk or other structure which can be cracked by a root of a tree, and which also includes a tree centered on said location and which is of a kind whose roots can reach and crack the structure, the improvement comprising:
a root deflector disposed between said planting location and most of said structure, said deflector being made of a material which does not disintegrate when lying in the ground and having root impenetrable smooth walls with a bottom at a depth at which horizontally-growing roots under the structure would not crack the structure when the roots are mature, said deflector being constructed to allow roots to grow thereunder, whereby roots upon contacting said deflector are generally directed downwardly and can emerge only from the bottom of the deflector at a depth that prevents them from cracking the sidewalk or other nearby structure.

8. The tree installation described in claim 7 wherein: said depth is approximately one foot below ground level.

9. A multi-purpose tree planter assembly for nursery forcing of trees, which can be planted in the ultimate location along with the contained tree, to function as a root deflector for the protection of adjacent structural devices, comprising:
a closed sidewall which diverges downwardly and outwardly relative to ground level, said sidewall being made of slick root-impenetrable material;
the inside of said sidewall containing a plurality of spaced root directing ridges perpendicular to said sidewall and extending from adjacent the top to adjacent the bottom of the sidewall;
the bottom of said sidewall having means to receive and attach a bottom cover; and
a bottom cover, said bottom cover having means to mate with and attach to said means at the bottom of said sidewall container, whereby said bottom cover initially can be attached to said sidewall and removed therefrom before said planter and its contents are planted, said bottom cover having drainage holes provided therein.

10. A method for creating a tree installation at a planting location located near a sidewalk or the like, comprising:
growing the roots of a tree, of a kind which when full-grown has roots that can crack a nearby sidewalk, in a container which has smooth and root-impenetrable sidewalls of a material which does not disintegrate when lying in the ground;
forming a planting hole at said planting location which is wider than said container; and
installing said container, with the bottom thereof free of obstructions to root passage, in said planting hole, at a depth at which horizontally-growing roots under the sidewalk would not crack the sidewalk when the roots are mature, and filling the region around said container with filler material, whereby roots are deflected downwardly and can emerge only from the bottom of the container at a depth that prevents them from cracking a nearby sidewalk or the like.

11. The method described in claim 10 wherein:
said step of growing the roots of a tree in said container includes positioning said container, with the bottom of the container free of obstructions to root passage therethrough, so that the bottom rests in soil, and allowing said tree to mature enough that at least ome of the tree roots extend to the sidewalls of the container and thence downwardly out of the bottom of the container; and
cutting off the roots of the tree at a location approximately even with the bottom of the container sidewalls, prior to said step of installing said container in said planting hole.

12. The method described in claim 10 wherein: said step of filling the region around said container with filler material includes applying gravel immediately against at least one side of said container.

13. A method for growing and installing a tree so as to minimize damage by roots to adjacent structures comprising the steps of:
providing a container made of slick root impenetrable material having a closed sidewall which diverges downwardly and outwardly relative to ground level, and a removable bottom cover;
growing a tree in said container with said cover attached;
removing said bottom cover from said container;
digging a hole in a preselected planting location larger than said plant container;
planting the container and its contents minus the bottom cover in said hole;
filling said hole around said container with gravel, whereby said tree container will remain in the soil to effect tree root deflection to minimize structural damage to adjacent structures.

* * * * *

REEXAMINATION CERTIFICATE (1302nd)
United States Patent [19]
Moorman et al.

[11] B1 4,019,279

[45] Certificate Issued  Jun. 12, 1990

[54] ROOT CONTROL PLANTER

[75] Inventors: Maurice D. Moorman; Leonard N. Albrecht, both of Los Angeles, Calif.

[73] Assignee: Deep Root Corp., Westminster, Calif.

Reexamination Request:
No. 90/001,577, Aug. 12, 1988

Reexamination Certificate for:
Patent No.: 4,019,279
Issued: Apr. 26, 1977
Appl. No.: 585,048
Filed: Jun. 9, 1975

[51] Int. Cl.⁵ .................. A01G 17/00; A01G 9/02; A01G 1/08
[52] U.S. Cl. .......................... 47/25; 47/33; 47/66; 47/84; 47/73; 47/58

[56] References Cited

U.S. PATENT DOCUMENTS

| Number | Date | Name | Class |
|---|---|---|---|
| 47,234 | 4/1865 | Wardwell | |
| 78,233 | 5/1868 | Poullain | |
| 100,300 | 3/1870 | Ludlum | |
| 109,098 | 11/1870 | Adams | |
| 160,088 | 2/1875 | Eby | |
| 172,616 | 1/1876 | Eby | |
| 173,446 | 2/1876 | Cottman | |
| 221,620 | 11/1879 | Sikes | |
| 1,425,588 | 8/1922 | Hanson | |
| 1,500,917 | 7/1924 | Bell | |
| 1,530,109 | 3/1925 | Cummings | |
| 1,534,508 | 4/1925 | Earp-Thomas | |
| 1,636,625 | 7/1927 | Conrad | |
| 1,846,980 | 2/1932 | Singer | |
| 1,874,029 | 8/1932 | Condon | |
| 2,017,308 | 10/1935 | Elmer | 47/37 |
| 2,319,081 | 5/1943 | Neeper | 47/37 |
| 2,436,770 | 2/1948 | Hill et al. | 47/33 |
| 2,756,541 | 7/1956 | Berger | 47/34 |
| 2,758,419 | 8/1956 | Schmitz | 47/37 |
| 2,769,277 | 11/1956 | Keelor | 47/33 |
| 2,859,558 | 11/1958 | Hallum | 47/37 |
| 3,053,010 | 9/1962 | DeShazor, Jr. | 47/34 |
| 3,184,890 | 5/1965 | McKey | 47/37 |
| 3,238,671 | 3/1966 | Binyon | 47/37 |
| 3,302,325 | 2/1967 | Ferrand | 47/37 |
| 3,328,913 | 7/1967 | Vogt | 47/34 |
| 3,415,013 | 12/1968 | Galbraith | 47/37 |
| 3,469,341 | 9/1969 | Bourget et al. | 47/37 |
| 3,484,989 | 12/1969 | Lazinsky | 47/33 |
| 3,800,469 | 4/1974 | Lau, Jr. et al. | 47/34 |
| 3,828,473 | 8/1974 | Morey | 47/58 |
| 3,889,416 | 6/1975 | Bergeron et al. | 47/34.13 |
| 3,916,563 | 11/1975 | Tedesh | 47/33 |
| 3,951,294 | 4/1976 | Wilson | 220/5 R |
| 3,991,516 | 11/1976 | Cicero | 47/34 R |

FOREIGN PATENT DOCUMENTS

| | | | |
|---|---|---|---|
| 197596 | 3/1920 | Canada | |
| 275231 | 11/1927 | Canada | |
| 836227 | 3/1970 | Canada | 47/21 |
| 122561 | 5/1900 | Fed. Rep. of Germany | |
| 110004 | 11/1964 | Netherlands | 45/1 |

OTHER PUBLICATIONS

"The Complete Family Flower & Garden Book", 1975, pp. 51 and 464.
"10,000 Garden Questions Answered by 20 Experts", vol. 1 (1959), pp. 286–289, 672–673.
Montgomery Ward "1979 Suburban Farm & Garden" advertisement, p. 45.
"Proceedings of the 43rd Int'l Shade Tree Conference", Aug. 26–Sep. 1, 1967, pp. 30–39, 131–136.
Sunset (Jul. 1967) "Greedy Tree Roots—and Why It's Sometimes Wise to Cut Them", pp. 64 and 65.
Botanical Gazette, vol. 128, #2, Jun. 1967, "Root Growth Around Barriers" by Brayton F. Wilson, pp. 79–82.
"1001 Garden Questions Answered" by Alfred Carl Hottes, 1959, pp. 142 and 143.
Tree Planter Notes, U.S. Dept. of Agriculture, Forest Service (Feb. 1973) "Conical Container Improves Seedling Growth on Dry Sites", pp. 26–29.
"Methods for the Examination of Root Systems and Roots" by Schuurman et al., 1971, pp. 48–51 and 62–67.
"Trees for Architecture and the Landscape" by Robert L. Zion, 1968, pp. 116–118.
"Proceedings of the 38th Int'l Shade Tree Conference", Aug. 5–10, 1962, pp. 85–102.
"Plant-a-Tree, A Working Guide to Regreening America" by Michael Weiner, 1975, pp. 64 and 65.
"Root Growth Proceedings of the 15th Easter School in Agricultural Science, Univ. of Nottingham, 1968", pp. 364–367, 370–371.
"Trees Structure & Function" by Zimmermann et al., 1971, p. 56.
House Beautiful (May, 1962) "How to Save Trees When You Pave or Change the Grade", p. 146 et seq.
"The Random House College Dictionary" definition of corrugate.

*Primary Examiner*—Danton DeMille

[57] ABSTRACT

A tree planter which prevents the roots of a tree from cracking a nearby sidewalk, including a planting container which is buried in the ground with a young tree therein, the container having sidewalls of slick and impenetrable material such as plastic, and with the sidewalls sloping outwardly, so that the open bottom of the container is larger than the top, to help deflect roots downwardly so that when they begin growing outwardly they grow at a level far below the sidewalk.

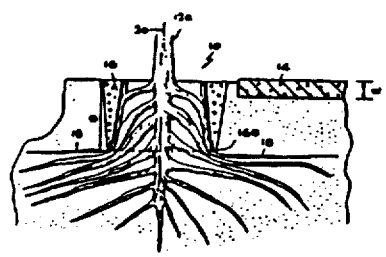

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4-6, 9, 11 and 13 are cancelled.

Claims 1, 7 and 10 are determined to be patentable as amended.

Claims 2, 3, 8 and 12, dependent on an amended claim, are determined to be patentable.

New claims 14-25 are added and determined to be patentable.

1. In a tree installation which includes a planting location near a sidewalk or other structure which can be cracked by a root of a tree, and which also includes a tree centered on said location and which is of a kind whose roots can reach and crack the structure, the improvement comprising:
a root deflector disposed between said planting location and most of said structure, said deflector being made of a material which does not disintegrate with time and having root impenetrable smooth walls with a top at least within a few inches of ground level and with a bottom at least one foot below the top of the ground, *a plurality of vertically-extending ridges formed on a side of said deflector wall which faces said tree and extending along most of the height of said wall, with said ridges laterally spaced from one another, whereby to minimize entanglement of deflected roots,* said deflector being open at the bottom, whereby roots upon contacting said deflector are generally directed downwardly and can emerge only from the bottom of the deflector at a depth that prevents them from cracking the sidewalk or other nearby structure.

7. In a tree installation which includes a planting location near a [sidewalk or other] *static* structure which can be cracked by a root of a tree, and which also includes a tree centered on said location and which is of a kind whose roots can reach and crack the structure, the improvement comprising:
a root deflector disposed between said planting location and most of said structure, said deflector being made of a material which does not disintegrate when lying in the ground and having root impenetrable smooth walls with a bottom at a depth at which horizontally-growing roots *from said tree and located* under the structure would not crack the structure when [the] *said* roots are mature, *said deflector having ridge means provided on the side thereof facing said tree to prevent said roots from growing sidewardly, said ridge means extending outwardly from said walls,* said deflector being constructed to allow said roots to grow thereunder, whereby *said* roots upon contacting said deflector are generally directed downwardly and can emerge only from the bottom of the deflector at a depth that prevents them from cracking [the sidewalk or other] *said* nearby structure.

10. A method for creating a tree installation at a planting location located near a [sidewalk or the like] *static structure which can be cracked by a root of a tree,* comprising:
growing the roots of a tree, of a kind which when full-grown has roots that can crack [a] *said* nearby [sidewalk] *static structure,* in a container which has smooth and root-impenetrable sidewalls of a material which does not disintegrate when lying in the ground, *said container having provided thereon, on the side of said sidewalls facing said roots, means to prevent said roots from growing sidewardly and to minimize entanglement of said roots, said means extending outwardly from said sidewalls;*
forming a planting hole at said planting location which is wider than said container; and
installing said container, with the bottom thereof free of obstructions to [root] passage *of said roots*, in said planting hole, at a depth at which horizontally-growing *ones of said* roots under [the sidewalk] *said static structure* would not crack [the sidewalk] *said static structure* when the roots are mature, and filling the region around said container with filler material, whereby *said* roots are deflected downwardly and can emerge only from the bottom of the container at a depth that prevents them from cracking [a nearby sidewalk or the like] *said static structure.*

*14. The method recited in claim 10 wherein:*
*said means to prevent said roots from growing sidewardly comprises a plurality of ridges formed on the side of said deflector wall which faces said tree, said ridges extending largely vertically, said ridges being laterally spaced from one another.*

*15. The improvement described in claim 7 wherein:*
*said ridge means comprises a plurality of ridges formed on the side of said deflector wall which faces said tree, said ridges extending downwardly along said wall and being laterally spaced from one another.*

*16. The improvement described in claim 15 wherein:*
*said ridges extend for substantially the full height of said wall.*

*17. The improvement described in claim 15 wherein:*
*each of said ridges has sides that are substantially perpendicular to the portion of said deflector wall from which it extends.*

*18. The improvement described in claim 15 wherein:*
*said ridges have sides that meet said deflector wall at abrupt corners.*

*19. The invention as claimed in claim 7, in which said material is polyethylene.*

*20. In combination:*
*a static structure which can be cracked by a root of a tree;*
*a tree planted near said static structure,*
*said tree being of a kind whose roots can reach and crack said static structure; and*
*a root deflector disposed between said tree and said static structure,*
*said deflector being made of a material which does not disintegrate with time when lying in the ground and having root impenetrable smooth walls with a top at* least within a few inches of ground level and with a
bottom at least one foot below the top of the ground, said deflector having downwardly-extending ridges provided on the side of said deflector which faces said tree, said ridges being laterally spaced from each other and extending outwardly from said walls at abrupt angles to said walls, said deflector being open at the bottom, whereby roots from said tree, upon contacting said deflector, are generally directed downwardly and can emerge only from the bottom of the deflector at a depth that prevents them from cracking said static structure.

21. In combination:

a static structure which can be cracked by a root of a tree;

a tree planted near said structure, said tree being of a kind whose roots can reach and crack said structure; and a root deflector disposed between said tree and said structure, said deflector being made of a material which does not disintegrate when lying in the ground and having root impenetrable smooth walls with a bottom at a depth at which horizontally-growing roots from said tree and located under said structure would not crack the structure when the roots are mature, said deflector having means provided on the side thereof facing said tree to prevent roots from said tree from growing sidewardly along said side, said means extending outwardly from said side, said deflector being constructed to allow roots from said tree to grow thereunder, whereby roots from said tree, upon contacting said deflector, are generally directed downwardly and can emerge only from the bottom of the deflector at a depth that prevents them from cracking said nearby structure.

22. A method of creating a tree installation at a planting location near a static structure which can be cracked by a root of a tree, comprising:

providing a container having smooth and root-impenetrable sidewalls of a material which does not disintegrate when lying in the ground, and having an open bottom free of obstruction to root passage, and providing outwardly-extending ridges on the inner side of said container to prevent tree roots from growing sidewardly, selecting the diameter of said container so that it is greatly larger than the diameter of the trunk of a tree to be planted therein, and selecting the diameter of said container and the dimensions of said ridges so that the inner portion of said ridges will be spaced a substantial distance from said trunk of said tree to be centered in said container, forming a planting hole in the ground at a planting location near a static structure, the planting hole being wider than said container, installing said container, with the bottom thereof free of obstructions to root passage, in said planting hole at a depth of which horizontally-growing roots under said structure would not crack said structure when the roots are mature, filling the region around said container with filler material, growing the roots of a tree, of a kind which when full-grown has roots that can crack said nearby structure, in said container, and allowing said roots and tree to grow toward maturity while said container remains in position around said trunk, whereby said roots are deflected downwardly and can emerge only from the bottom of the container at a depth at which they will not crack said nearby structure.

23. The method recited in claim 22 wherein:

each of said ridges has sides that are substantially perpendicular to the portion of said container sidewalls from which it extends.

24. The method recited in claim 23 wherein:

said sides of said ridges meet said container sidewalls at abrupt corners.

25. The method recited in claim 22 wherein:

said ridges have sides that meet said container sidewalls at abrupt corners.

* * * * *